US011519529B2

(12) United States Patent
Kesler et al.

(10) Patent No.: US 11,519,529 B2
(45) Date of Patent: Dec. 6, 2022

(54) METAL SEALING THREADED (TUBE-O) FITTING

(71) Applicant: Hanon Systems, Daejeon (KR)

(72) Inventors: Eric Kesler, Northville, MI (US); Anthony Arruda, Ann Arbor, MI (US)

(73) Assignee: HANON SYSTEMS, Daejeon (KR)

( * ) Notice: Subject to any disclaimer, the term of this patent is extended or adjusted under 35 U.S.C. 154(b) by 943 days.

(21) Appl. No.: 15/609,093

(22) Filed: May 31, 2017

(65) Prior Publication Data
US 2018/0347731 A1 Dec. 6, 2018

(51) Int. Cl.
*F16L 19/02* (2006.01)
*F16L 19/028* (2006.01)

(52) U.S. Cl.
CPC ....... *F16L 19/0218* (2013.01); *F16L 19/0286* (2013.01)

(58) Field of Classification Search
CPC .............. F16L 19/0218; F16L 19/0286; F16L 19/0212; F16L 19/04; F16L 19/041; F16L 19/046; F16L 19/05
USPC ........................................................ 285/354
See application file for complete search history.

(56) References Cited

U.S. PATENT DOCUMENTS

| | | | |
|---|---|---|---|
| 2,545,930 A * | 3/1951 | Richardson | F16L 19/04 285/354 |
| 3,947,161 A * | 3/1976 | McLain | B23K 20/04 418/113 |
| 4,980,961 A * | 1/1991 | Caudill | B21D 19/16 285/382.5 |
| 5,961,160 A * | 10/1999 | Frohlich | F16L 19/0218 285/342 |
| 6,089,623 A * | 7/2000 | Schroeder | F16L 19/0286 285/353 |
| 6,168,211 B1 * | 1/2001 | Schorn-Gilson | F16L 19/028 285/348 |
| 6,527,304 B1 * | 3/2003 | Pliassounov | F16L 19/025 285/233 |
| 7,621,568 B2 * | 11/2009 | Schroeder | F16J 15/061 285/205 |
| 7,914,050 B2 * | 3/2011 | Udhofer | F16L 37/088 285/12 |
| 8,079,621 B2 * | 12/2011 | Ferlin | B21J 5/08 285/353 |

(Continued)

FOREIGN PATENT DOCUMENTS

| | | |
|---|---|---|
| JP | 51034956 U1 | 3/1976 |
| JP | 53007555 U1 | 1/1978 |

(Continued)

*Primary Examiner* — Matthew Troutman
*Assistant Examiner* — Fannie C Kee
(74) *Attorney, Agent, or Firm* — Shumaker, Loop & Kendrick, LLP; James D. Miller

(57) ABSTRACT

A flow control device for conveying a fluid therethrough includes a port having an engaging end configured for engagement with a tube fitting and an inner surface defining a passageway configured to provide fluid communication through the flow control device. A shoulder is formed on the inner surface of the port adjacent the engaging end. The shoulder defines a first seating surface and a second seating surface. A protuberance is formed on one of the first seating surface and the second seating surface.

8 Claims, 7 Drawing Sheets

(56) References Cited

U.S. PATENT DOCUMENTS

| | | | |
|---|---|---|---|
| 2002/0101079 A1* | 8/2002 | Ehrke | F16L 19/028 |
| | | | 285/354 |
| 2005/0023827 A1 | 2/2005 | Walterscheid et al. | |
| 2007/0236008 A1 | 10/2007 | Kim et al. | |
| 2009/0102190 A1* | 4/2009 | Koji | F16L 19/0286 |
| | | | 285/335 |
| 2009/0189391 A1* | 7/2009 | Ferlin | F16L 19/0286 |
| | | | 285/382.5 |
| 2010/0127493 A1* | 5/2010 | Felder | F16L 19/028 |
| | | | 285/389 |
| 2011/0214755 A1 | 9/2011 | Kesler et al. | |

FOREIGN PATENT DOCUMENTS

| | | |
|---|---|---|
| JP | H0731034 Y2 | 8/1991 |
| JP | 2009275808 A | 11/2009 |
| JP | 4389186 B2 | 12/2009 |
| KR | 20050057406 A | 6/2005 |
| KR | 20130105297 A | 9/2013 |
| KR | 101612064 B1 | 4/2016 |
| WO | 2004061353 A1 | 7/2004 |

\* cited by examiner

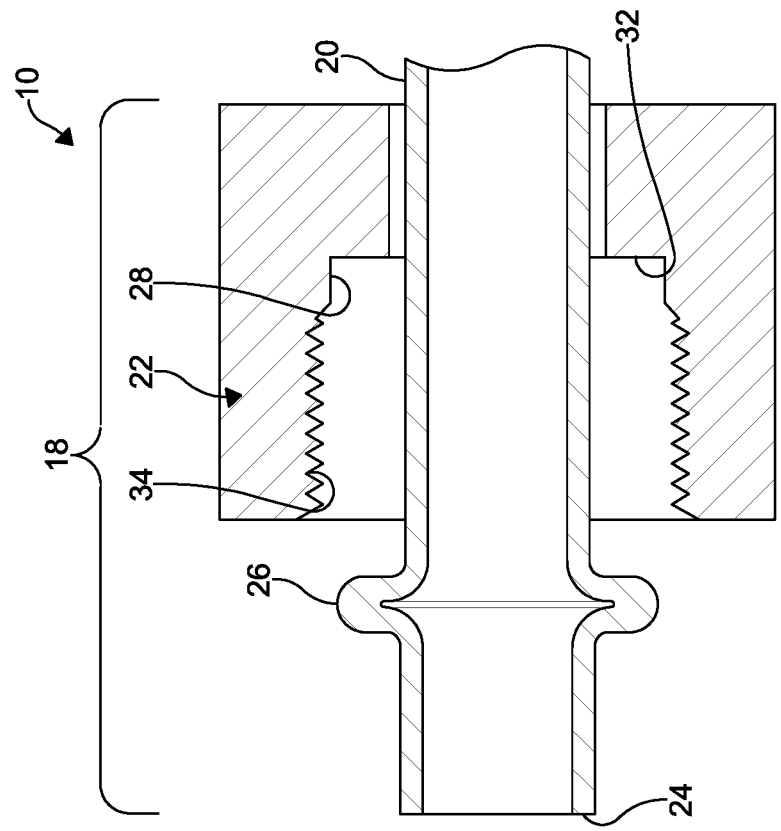
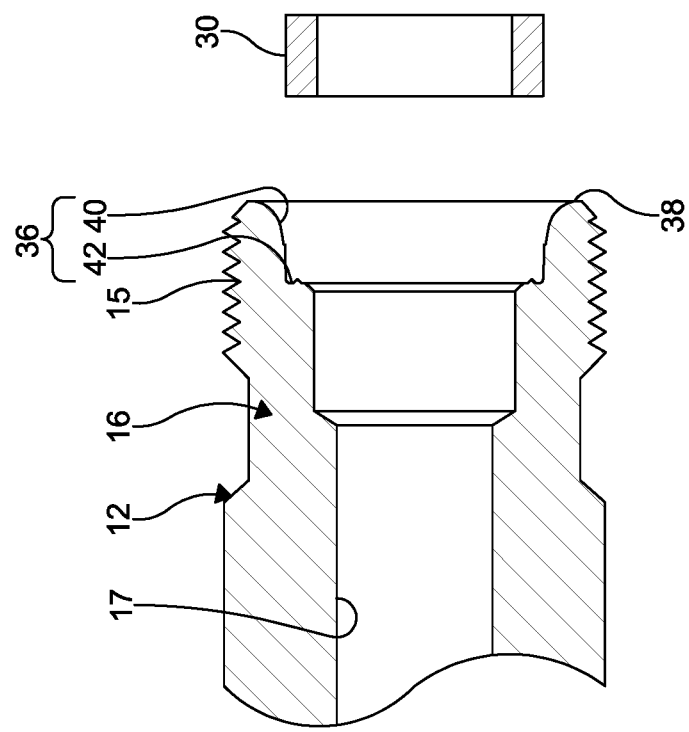
FIG. 2

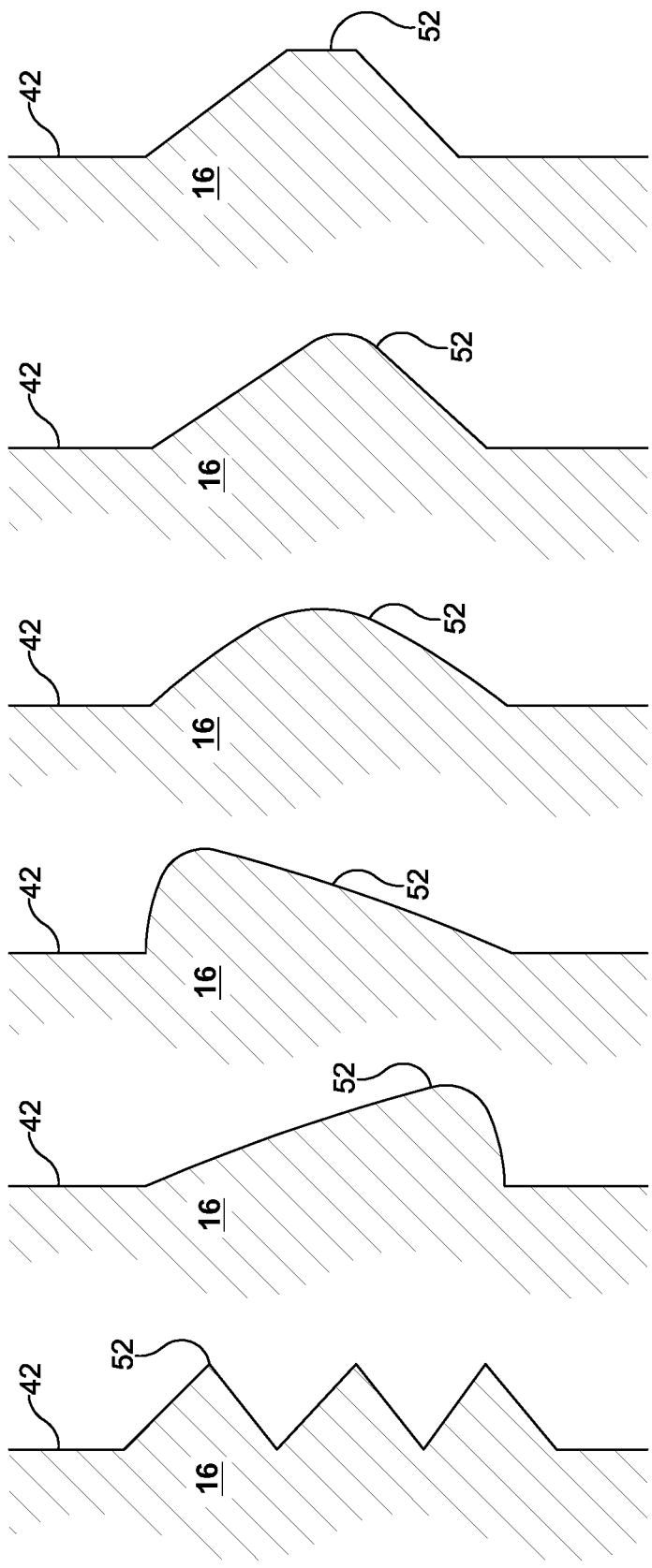

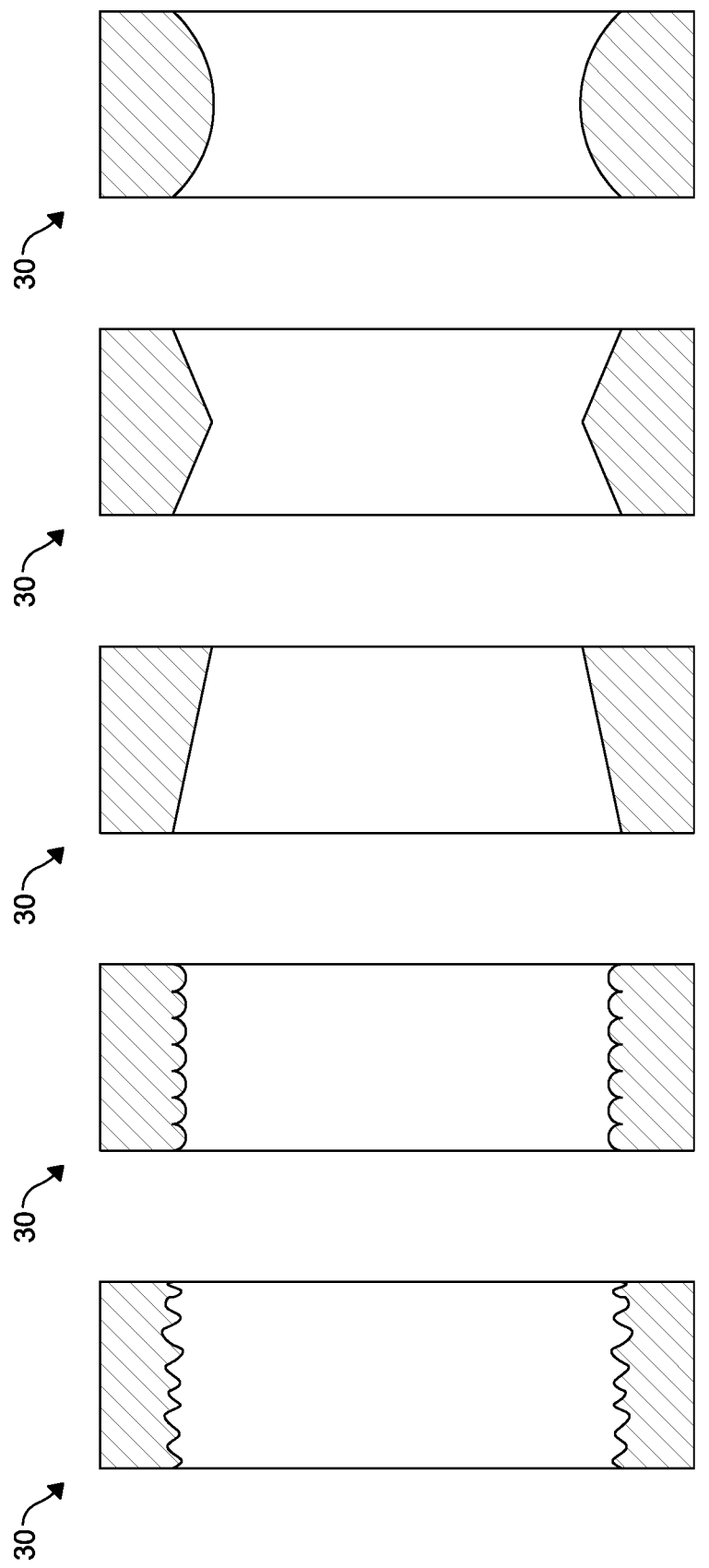

METAL SEALING THREADED (TUBE-O) FITTING

FIELD OF THE INVENTION

The invention relates to a flow control device and fitting assembly and more particularly to a flow control device and fitting assembly including a metal seal.

BACKGROUND OF THE INVENTION

As is commonly known, systems for conveying fluid include valves to prevent a direction of flow of fluid therethrough. For example, refrigerant systems of vehicles include valves such as shut-off valves, thermostatic expansion valves (TXV), and electric expansion valves (EXV) to control flow of a refrigerant therethrough. Certain refrigerant systems employ beaded tubes with a swivel connector and an o-ring seal, commonly referred to as a "tube-o", to connect to the valves. Specifically, the tube is a male fitting configured for engaging an inlet or an outlet female connector of the valve. The swivel connector engages external threads formed on the female connector to couple the tube to the connector. However, leakage of the refrigerant flowing through the refrigerant system can occur between the connectors of the valve and the respective tubes. The leakage is commonly a result of contamination and debris introduced during the assembly of the tubes to the valves, surface imperfections and misassembly of the components of the tubes and the valves, and inadequate sealing features.

One solution to the problem of leakage is to provide multiple o-ring seals to maximize radial sealing between the tube and the connector. However, providing multiple o-ring seals increases cost of components and complexity of assembly and only minimally reduces leakage. Another solution is to provide axial sealing gaskets which provide maximized sealing. However, the gaskets typically have a larger diameter compared to the o-ring seals which can be disadvantageous for applications requiring minimized package sizes. For example, refrigerant systems in electric vehicles and hybrid vehicles typically require smaller package sizes, wherein employing the gaskets may not be desired.

It would therefore be desirable to provide a flow control device and fitting assembly having a configuration minimizing the effects of contamination therein, wherein sealing, durability, and efficient operation is maximized, and package sizes and misassembly are minimized.

SUMMARY OF THE INVENTION

In accordance and attuned with the present invention, a flow control device and fitting assembly having a configuration minimizing the effects of contamination therein, wherein sealing, durability, and efficient operation is maximized, and package sizes and misassembly are minimized has surprisingly been discovered.

According to an embodiment of the disclosure a seal is disclosed. The seal is for sealing between a flow control device to a tube fitting of a flow control system. The seal includes an annular body. The annular body is a malleable material having a tin coating applied to an outer surface thereof. The annular body is compressed and deformable intermediate the flow control device and the tube fitting.

According to another embodiment of the disclosure a flow control device for conveying a fluid therethrough is disclosed. The flow control device includes a port having an engaging end configured for engagement with a tube fitting and an inner surface defining a passageway configured to provide fluid communication through the flow control device. A shoulder is formed on the inner surface of the port adjacent the engaging end. The shoulder defines a first seating surface and a second seating surface. A protuberance is formed on one of the first seating surface and the second seating surface.

According to a further embodiment of the disclosure a flow control system of a fluid flow system for conveying a fluid therethrough is disclosed. The flow control system includes a flow control device configured for controlling a flow of the fluid through the fluid flow system. The flow control device includes a port having an inner surface defining a passageway configured to provide fluid communication through the flow control device. A tube fitting engages the flow control device. The tube fitting includes a tube having a bead formed thereon spaced from a first end thereof. The passageway of the port receives at least a portion of the tube intermediate the first end of the tube and the bead. An annular metal seal is received on the tube and engaging the bead of the tube. The metal seal disposed intermediate the tube and the inner surface of the port.

BRIEF DESCRIPTION OF THE DRAWINGS

The above, as well as other objects and advantages of the invention, will become readily apparent to those skilled in the art from reading the following detailed description of an embodiment of the invention when considered in the light of the accompanying drawings which:

FIG. 2 is a partially exploded fragmentary cross-sectional front elevational view of a flow control device, a metal seal, and a tube fitting assembly of the flow control system of FIG. 1;

FIGS. 5A-5F are enlarged fragmentary cross-sectional elevational views of a seating surface similar to a seating surface highlighted by circle 5 in FIG. 4, showing alternate embodiments of a cross-sectional surface profile of the seating surface of a port of the flow control device;

FIGS. 7A-7E are cross-sectional front elevational views of the metal seal of FIGS. 1-4, showing alternate embodiments of a cross-sectional surface profiles of the metal seal.

DETAILED DESCRIPTION OF THE INVENTION

Figure 1:
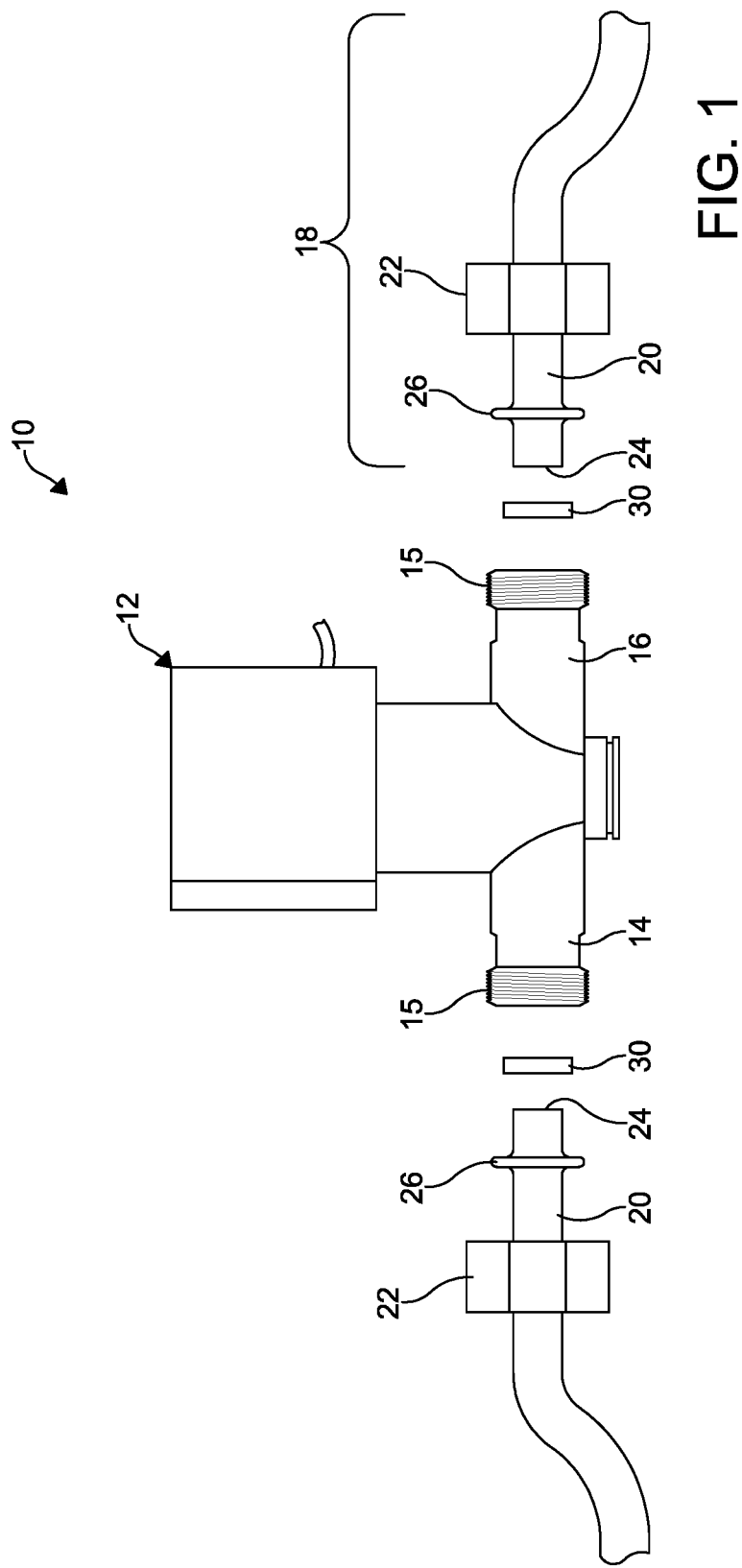
FIG. 1 is a partially exploded fragmentary front elevational view of a flow control system according to an embodiment of the present disclosure.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical, except as expressly stated. The terms "upper," "lower," and "above" and "below," and similar derivatives, are used for clarity only in reference to an orientation of a charge valve assembly as shown in FIG. 1.

FIGS. 1-3C illustrate a flow control system 10 according to an embodiment of the present disclosure. The flow control system 10 is configured to convey a fluid therethrough and forms a portion of a fluid flow system. For example, the fluid flow system can be a refrigerant system of a heating, ventilation, and air conditioning (HVAC) system of a vehicle such as an electric motor vehicle, a combustion engine vehicle, or a hybrid vehicle. Although, it is understood the fluid flow system can be any HVAC system used in other applications or a fluid flow system conveying any known fluid such as coolant, water, air, oil, or any other fluid, as desired. While not shown, it is understood the fluid flow system can include any number of components upstream or downstream of the flow control system 10 such as heat exchangers, flow control devices, conduits, meters, pumps, compressors, or other components typically employed with fluid flow systems. The flow control system 10 includes a flow control device 12, tube fittings 18 coupled to the flow control device 12, and a metal seal 30 disposed between the flow control device 12 and each of the tube fittings 18.

In the embodiment illustrated, the flow control device 12 is configured to control a flow of the fluid flowing thorough the flow control system 10 and, as a result, through the fluid flow system. For example, as shown in the illustrated embodiment, the flow control device 12 is a valve such as a shut-off valve. However, it is understood, the flow control device 12 can be any other valve commonly employed in fluid flow systems such as a thermostatic expansion valve (TXV) or an electric expansion valve (EXV), for example. The flow control device 12 can be configured as a check valve, a flow meter, a pump, a mixer, a sight, or any other device commonly employed to facilitate control of a flow property of the fluid flowing through the flow control system 10, and consequently, through the fluid flow system.

The flow control device 12 includes an inlet port 14 and an outlet port 16 for respectively conveying the fluid to the flow control device 12 and from the flow control device 12. FIGS. 2-3C illustrate at least portions of components of the outlet side of the flow control system 10 such as the outlet port 16, the metal seal 30, and the tube fitting 18 extending at the outlet side of the flow control device 12. However, it is understood the features, description, structure, and methods pertaining to the components of the outlet side of the flow control device 12 are substantially the same as the components of the inlet side of the flow control device 12 such as the inlet port 14, the metal seal 30, and the tube fitting 18. The description hereinafter pertains to both the inlet side and the outlet side of the flow control device 12. The outlet port 16 has an internal passageway 17 for providing fluid communication between the tube fitting 18 and the flow control device 12. The outlet port 16 also has external threads 15 for engaging internal threads 34 of the tube fitting 18. The outlet port 16 is configured as a "female" connector, wherein a portion of the tube fitting 18 is received in the passageway 17 of the port 16. It is also noted that the flow control device may consist of only the inlet port 14 or the outlet port 16.

The tube fitting 18 includes a tube 20 and a connector 22. The tube 20 has a first end 24 configured as a "male" connector, wherein the first end 24 is configured to be received in the passageway of 17 of the outlet port 16. An annular, radially outwardly extending bead 26 is formed on an outer surface of the tube 20 and spaced from the first end 24. A first portion of the tube 20 extending from the first end 24 to the bead 26 is received within the passageway 17 of the outlet port 16.

The connector 22 is tubular or ring shaped and is received on a second portion of the tube 20 extending from the bead 26 to a second end of the tube 20 and is freely axially moveable along a length of the second portion of the tube 20. A receiving portion of an inner surface 28 of the connector 22 is configured to receive the first portion of the tube 20. A seating surface 32 formed on the inner surface 28 of the connector 22 is configured to engage the bead 26 of the tube 20 to militate against axial movement of the connector 22. Accordingly, only the receiving portion of the connector 22 extends axially beyond the bead 26 towards the first end 24. The internal threads 34 are formed on the inner surface 28 of the connector 22 and are configured to engage the external threads 15 formed on the outlet port 16. It should be understood other forms of engaging the connector 22 with the outlet port 16 without the respective threads 15, 34 can be contemplated without departing from the scope of the disclosure. For example, the connector 22 can engage with the port 16 by a friction-fit connection, a cam-style connection, or other connection, as desired such as a "peanut" style block fitting with a leveraged stud and nut arrangement to impart an axial clamp pressure onto the metal seal 30.

A shoulder 36 is formed on the inner surface defining the passageway 17 of the outlet port 16 adjacent a distal engaging end 38 of the outlet port 16. The shoulder 36 defines a first seating surface 40 and a second seating surface 42. The first seating surface 40 extends in an axial direction from the engaging end 38 of the outlet port 16 to the second seating surface 42 which extends substantially perpendicular to the axial direction of the outlet port 16. The first seating surface 40 is tapered, wherein a diameter of the passageway 17 increases from the second seating surface 42 to the engaging end 38 of the outlet port 16. In a non-limiting example, the first seating surface 40 tapers at a five degree angle with respect to the axial direction of the outlet port 16. However, the first seating surface 40 can taper at any desired angle such as greater than five degrees or less than five degrees.

The metal seal 30 is an annular substantially cylindrically shaped seal formed from a soft malleable metal. As used herein, the "soft" malleable metal means a material that can be compressed and is deformable to flow and fill spaces and surface deformities between the outlet port 16 and the tube fitting 18. For example, a list of "soft" metals can be found according to Mohs hardness scale. In one example, the metal seal 30 is formed from a copper material. In another example, the metal seal 30 is formed from an aluminum material. However, other soft materials can be employed to form the metal seal 30 such as silver, tin, lead, gold, zinc, brass, or bronze, if desired. The metal seal 30 typically includes a tin coating applied to the outer surface thereof applied by any known tin coating process such as a plating or a dipping process, for example. The tin coating serves as a dry lubricant while also facilitating the flow of the metal seal 30 to fill the spaces and the surface deformities between the outlet port 16 and the tube fitting 18. In certain embodiments the tin coating has a thickness of about 0.0002 inches. Although, it is understood the thickness of the tin coating can be greater than or less than 0.0002 inches if desired. It is understood, a non-metallic seal can also be employed, if desired, such as nylon or other polymers, for example.

Figure 3A:
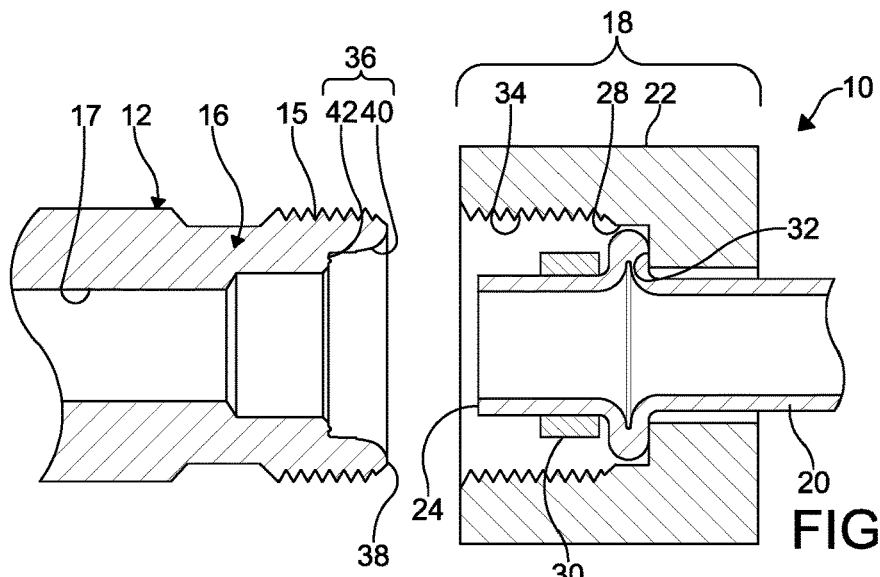
FIG. 3A is a partially exploded fragmentary cross-sectional front elevational view of the flow control device, the metal seal, and the tube fitting assembly of FIG. 2 illustrating a first stage of assembly, wherein the metal seal is disposed about the tube fitting.
Figure 3B:
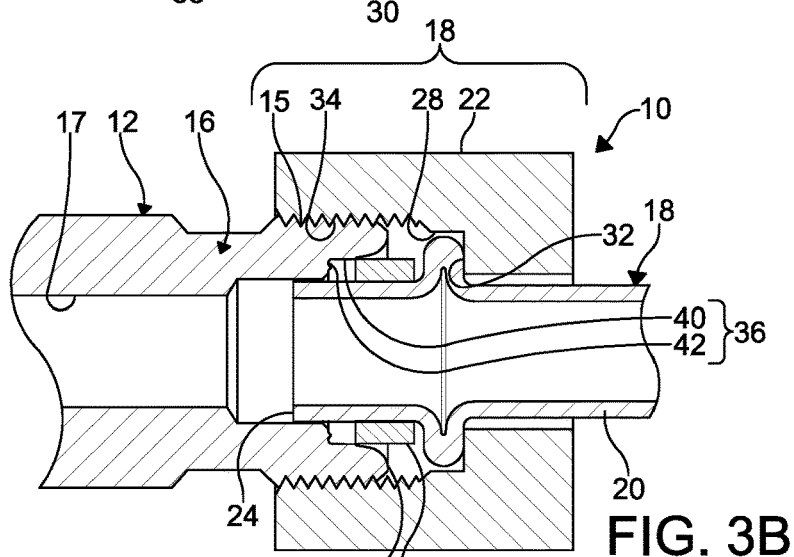
FIG. 3B is a partially assembled fragmentary cross-sectional front elevational view of the flow control device, the metal seal, and the tube fitting assembly of FIG. 2 illustrating a second stage of assembly, wherein the female connector is partially engaging the tube fitting.
Figure 3C:
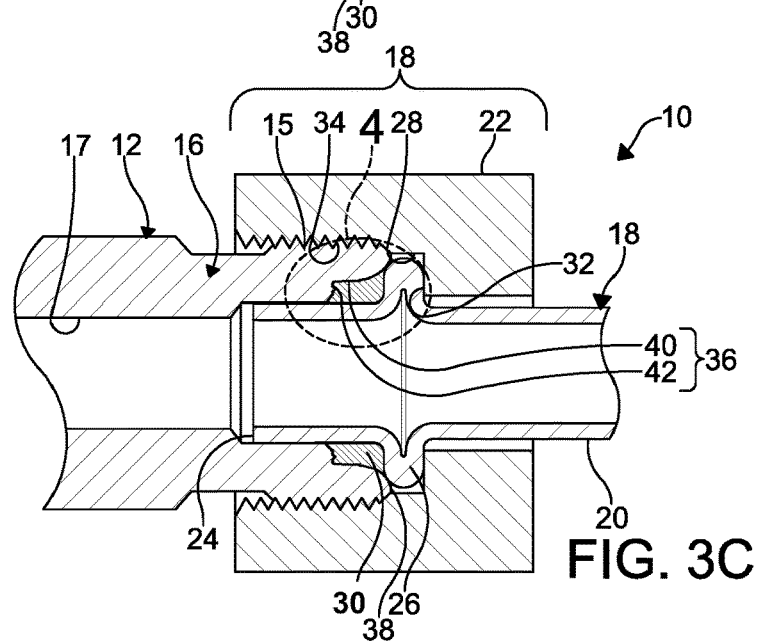
FIG. 3C is an assembled fragmentary cross-sectional front elevation view of the flow control device, the metal seal, and the tube fitting assembly of FIG. 2.

FIGS. 3A-3C illustrate the steps for assembling the flow control device 12, the metal seal 30, and the tube fitting 18 to each other. As shown in FIG. 3A, the metal seal 30 is received on the first portion of the tube 20 and engages the bead 26. When the seating surface 32 of the connector 22 engages the bead 26 of the tube 20, the first portion of the connector 22 extends over the metal seal 30. As shown in FIG. 3B, the outlet port 16 receives the first portion of the tube 20 and is received in and engage with the connector 22. In the embodiment illustrated, the external threads 15 of the outlet port 16 engage the internal threads 34 of the connector 22 to connect the outlet port 16 to the tube fitting 18. However, in other embodiments, the outlet port 16 can engage the connector 22 by other means such as a friction-fit connection, a cam-style connection, or other connection means, if desired such as a "peanut" style block fitting with a leveraged stud and nut arrangement to impart the axial clamp pressure onto the metal seal 30. As the connector 22 receives and engages the outlet port 16, the tube 20 moves axially within the passageway 17 of the port 16 and the engaging end 38 of the outlet port 16 is moved axially towards the bead 26 of the tube 20. As the tube 20 moves axially within the passageway 17, the metal seal 30 adjacent and engaging the bead 26 of the tube 20 is urged towards the second seating surface 42 of the outlet port 16 to be seated within the shoulder 36.

FIG. 3C illustrates a third step, wherein the tube fitting 18, the metal seal 30, and the outlet port 16 are assembled to each other. As the metal seal 30 moves towards the second seating surface 42 of the outlet port 16, the metal seal 30 is compressed between the outlet port 16 and the tube 20. Torque or pressure applied by the connector 22 engaging with the outlet port 16 causes the metal seal 30 to deform. As a result, the metal seal 30 deforms and fills a space formed between the shoulder 36 and the tube 20. Advantageously, due to the softness of the metal and the tin-coating, the metal seal 30 easily conforms to a shape of the space formed between the shoulder 36 and the tube 20 to facilitate a maximized seal therebetween. Additionally, when compressed, the metal seal 30 flows to and fills any surface irregularities such as scratches formed in the inner surface of the outlet port 16 and outer surface of the tube 20.

Figure 4:
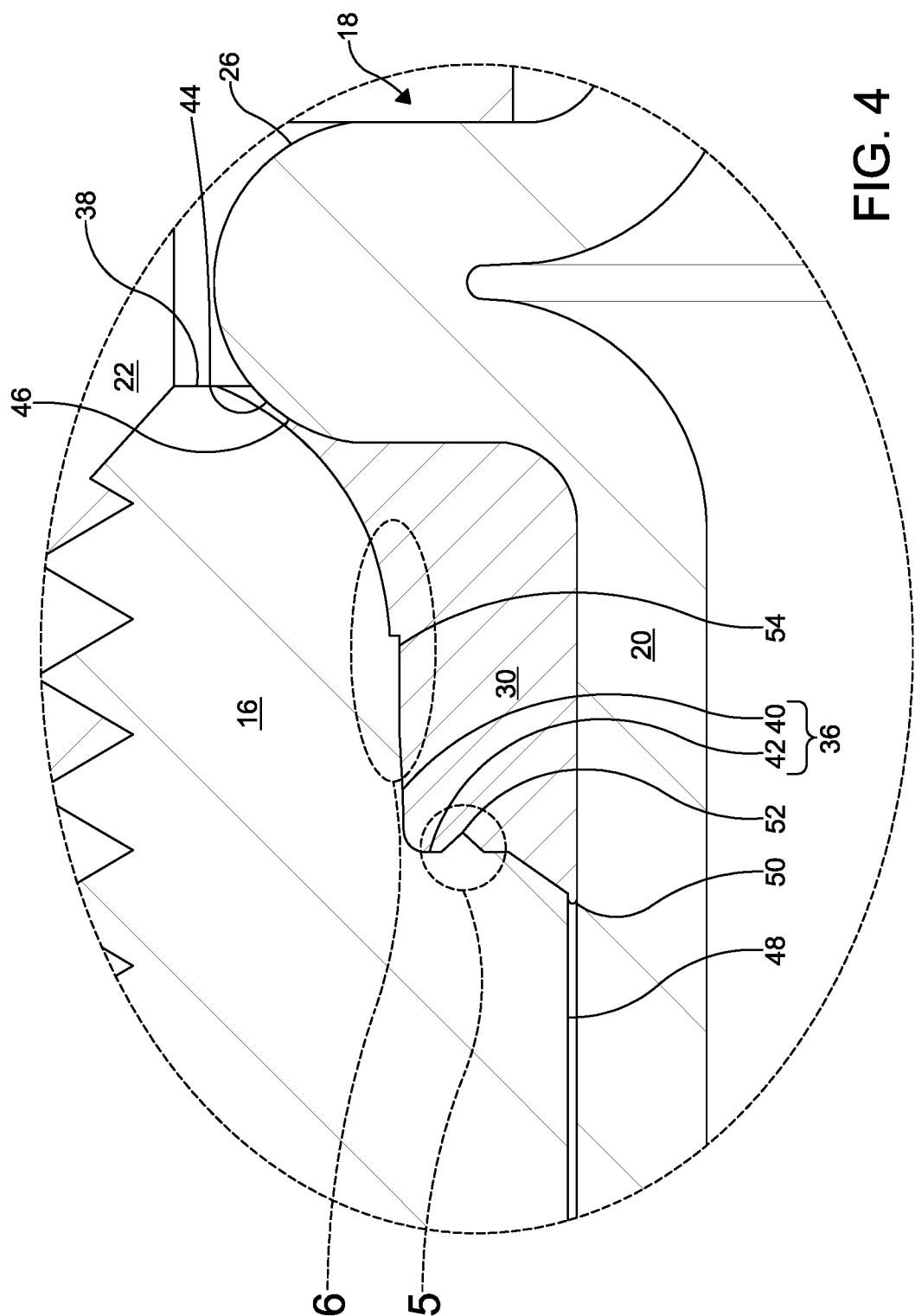
FIG. 4 is an enlarged fragmentary cross-sectional front elevational view of the flow control device, the metal seal, and the tube fitting assembly highlighted by circle 4 in FIG. 3C.

As shown in FIG. 4, according to an embodiment of the disclosure, a first portion 46 of the metal seal 30 is configured to extrude in a gap 44 formed between the engaging end 38 of the outlet port 16 and the bead 26 as the metal seal 30 is compressed between the tube 20 and the outlet port 16. The gap 44 militates against the tube 20 contacting the outlet port 16. The first portion 46 of the metal seal 30 acts as a stop to further militate against the engaging end 38 of the outlet port 16 directly contacting the tube 20 during assembly or during operation of the flow control system 10. In order to maximize sealing, the metal seal 30 has a volume substantially equal to or greater than a volume of the space defined by the shoulder 36 of the outlet port 16 and the tube 20, including the gap 44. It is also understood a second portion 50 of the metal seal 30 can also extrude in a slot 48 formed intermediate the first portion of the tube 20 and the inner surface of the outlet port 16 adjacent the second seating surface 42.

As shown in FIG. 4, the metal seal 30 engages and is compressed between the outlet port 16 and the tube 20 to form a seal therebetween. The second seating surface 42 has a substantially linear cross-sectional profile. However, the seal can be realized with a first protuberance 52 extending outwardly from the second seating surface 42. The first protuberance 52 has a substantially triangular cross-sectional profile. The first protuberance 52 advantageously penetrates through undesired debris, foreign materials, or surface imperfections generated by manufacturing the components (the outlet port 16, the tube fitting 18, and the metal seal 30), the assembly of the components, and an introduction of external or environmental particulates as the components are being fully assembled. The first protuberance 52 facilitates radial sealing of the metal seal 30 to the outlet port 16 by maximizing the engagement of metal 30 with the port 16.

In other embodiments, the seal can be realized with the various cross-sectional profiles of the first protuberance 52 such as shown in the exemplary alternate embodiments illustrated in FIGS. 5A-5F. For example, the first protuberance 52 can have a substantially trapezoidal shape (FIG. 5F), a substantially symmetrical arcuate cross-sectional profile with varying degrees of arcs (FIGS. 5B-5C), a substantially arcuate cross-sectional profile with varying asymmetries (FIGS. 5D-5E), and a substantially saw-toothed-shaped cross-sectional profile (FIG. 5A). However, the first protuberance 52 can have any cross-sectional shape as desired such as substantially rectangular, substantially polygonal, substantially sinusoidal, or any symmetrical or irregular shape as desired. Additionally, it is understood the first seating surface 40 can include more than one protuberance formed therein.

The first seating surface 40 has a substantially linear cross-sectional profile. However, the sealing can be realized with a second protuberance 54 extending outwardly from the first seating surface 40. The second protuberance 54 has a substantially wedge-shaped cross-sectional profile. The second protuberance 54 advantageously penetrates through undesired debris, foreign materials, or surface imperfections generated by manufacturing the components (the outlet port 16, the tube fitting 18, and the metal seal 30), the assembly of the components, and an introduction of external or environmental particulates as the components are being fully assembled. The second protuberance 54 facilitates axial sealing of the metal seal 30 to the outlet port 16, and more specifically to the first seating surface 40, by maximizing the engagement of metal seal 30 with the port 16.

Figure 6A:
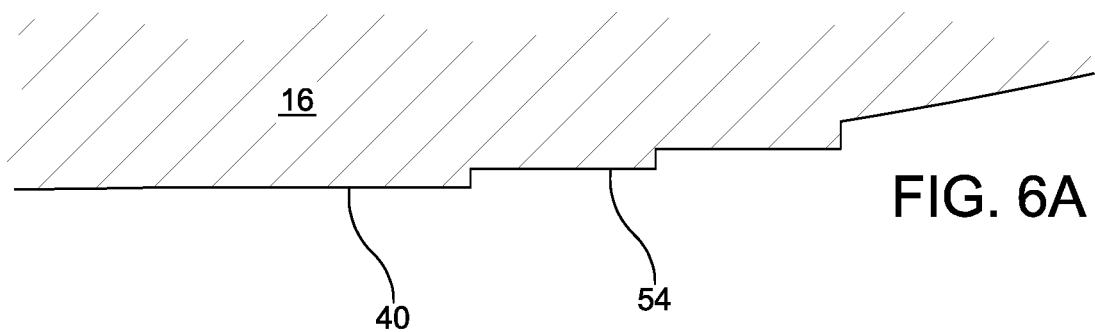
FIGS. 6A-6C are enlarged fragmentary cross-sectional elevational views of a seating surface similar to a seating surface highlighted by circle 6 in FIG. 4, showing alternate embodiments of a cross-sectional surface profile of the seating surface of a port of the flow control device.
Figure 6B:
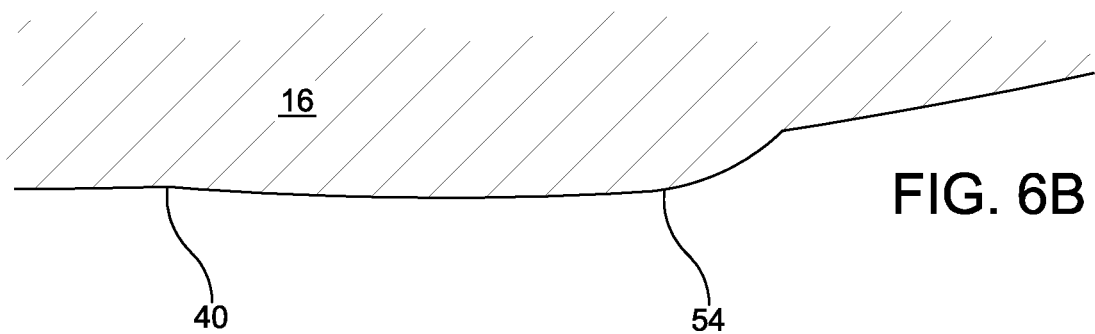
Figure 6C:
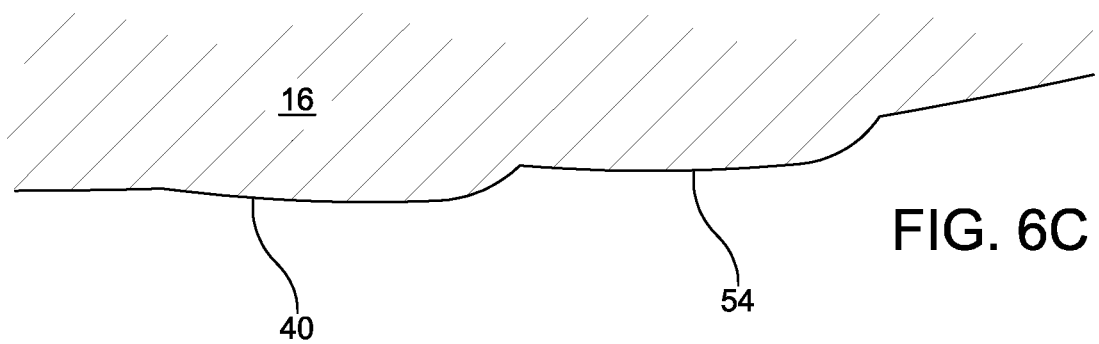

In other embodiments, the seal can be realized with the various cross-sectional profiles of the second protuberance 54 such as shown in the exemplary alternate embodiments illustrated in FIGS. 6A-6C. For example, the second protuberance 54 can have a substantially saw-toothed shape (FIG. 6A), a substantially arcuate cross-sectional profile with varying numbers of arcs (FIGS. 6B-6C), or any other cross-sectional shape as desired such as substantially rectangular, substantially polygonal, or any symmetrical or irregular shape as desired. Additionally, it is understood the second seating surface 42 can include more than one separate protuberance formed thereon.

It should be understood that the cross-sectional surface profile of the annular metal seal 30 can be of varying cross-sectional geometries to enhance retention of the metal seal 30 to the tube 20. Examples of the various cross-sectional surface profiles is shown, but not limited to, those in FIGS. 7A-7E. In the non-limiting embodiments illustrated the inner annular surface of the metal seal 30 can have a wavy cross-sectional profile (FIG. 7B), a saw-toothed cross-sectional profile (FIG. 7A), a tapered cross-sectional profile (FIG. 7C), a triangular cross-sectional profile (FIG. 7D), or an arcuate cross-sectional profile (FIG. 7E).

The flow control system 10 has many advantages as discussed hereinabove. Mainly, the configuration of the flow control system 10 includes improved sealing, particularly between the ports 14, 16 and the respective tube fittings 18. The flow control system 10 militates against debris compromising effectual sealing between the ports 14, 16 and the tube fittings 18. The soft composition of the metal seal 30 and tin coating permits the metal seal 30 to deform when compressed between the ports 14, 16 and the tube fittings 18 and flow into surface imperfections, gaps, and slots formed on or between the ports 14, 16 and the tube fittings 18. The tapered first seating surface 40 facilitates positioning the metal seal 30 within the shoulder 36 of each of the ports 14, 16 and facilitates and a more effectual and gradual compression of the metal seal 30 between the ports 14, 16 and the tube fittings 18 to maximize seating of the metal seal 30 when imperfections and debris exist within the flow control system 10. The configuration of the ports 14, 16, the metal seal 30, and the fittings 18 not only maximize sealing, but maximize contamination permeation while minimizing misassembly of the components and maintaining package size requirements.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A flow control system of a fluid flow system for conveying a fluid therethrough comprising:
   a flow control device configured for controlling a flow of the fluid through the fluid flow system, the flow control device including a port having an inner surface defining a passageway configured to provide fluid communication through the flow control device;
   a tube fitting engaging the flow control device, the tube fitting including a tube having a bead formed thereon spaced from a first end thereof, the passageway of the port receiving at least a portion of the tube intermediate the first end of the tube and the bead; and
   an annular metal seal received on the tube and engaging the bead of the tube, the metal seal disposed intermediate the tube and the inner surface of the port, wherein the inner surface of the port has a shoulder formed thereon adjacent an engaging end of the port, and the metal seal is disposed within the shoulder, and wherein a first seating surface and a second seating surface are defined by the shoulder, the second seating surface spaced from the engaging end of the port and the first seating surface extending from the second seating surface to the engaging end of the port, and wherein the metal seal directly engages both the first seating surface and second seating surface, wherein the first seating surface tapers radially outwardly from the second seating surface to the engaging end of the port.

2. The flow control system of claim 1, wherein the metal seal is formed from a soft malleable metal and includes a tin coating applied thereto.

3. The flow control system of claim 2, wherein the metal seal is one of a copper material and an aluminum material.

4. The flow control system of claim 1, wherein the metal seal is compressed between the port and the tube.

5. The flow control system of claim 1, wherein the first seating surface includes a protuberance extending outwardly therefrom.

6. The flow control system of claim 1, wherein the second seating surface includes a protuberance extending outwardly therefrom.

7. The flow control system of claim 1, wherein the tube fitting includes a connector received on the tube, the connector engaging the port and coupling the tube fitting to the port.

8. The flow control system of claim 1, wherein a gap is formed intermediate the engaging end of the port and the bead of the tube, and wherein a portion of the metal seal fills a portion of the gap.

* * * * *